J. L. MARSH.
Manufacture of Aqua Ammonia.
No. 230,303.  Patented July 20, 1880.
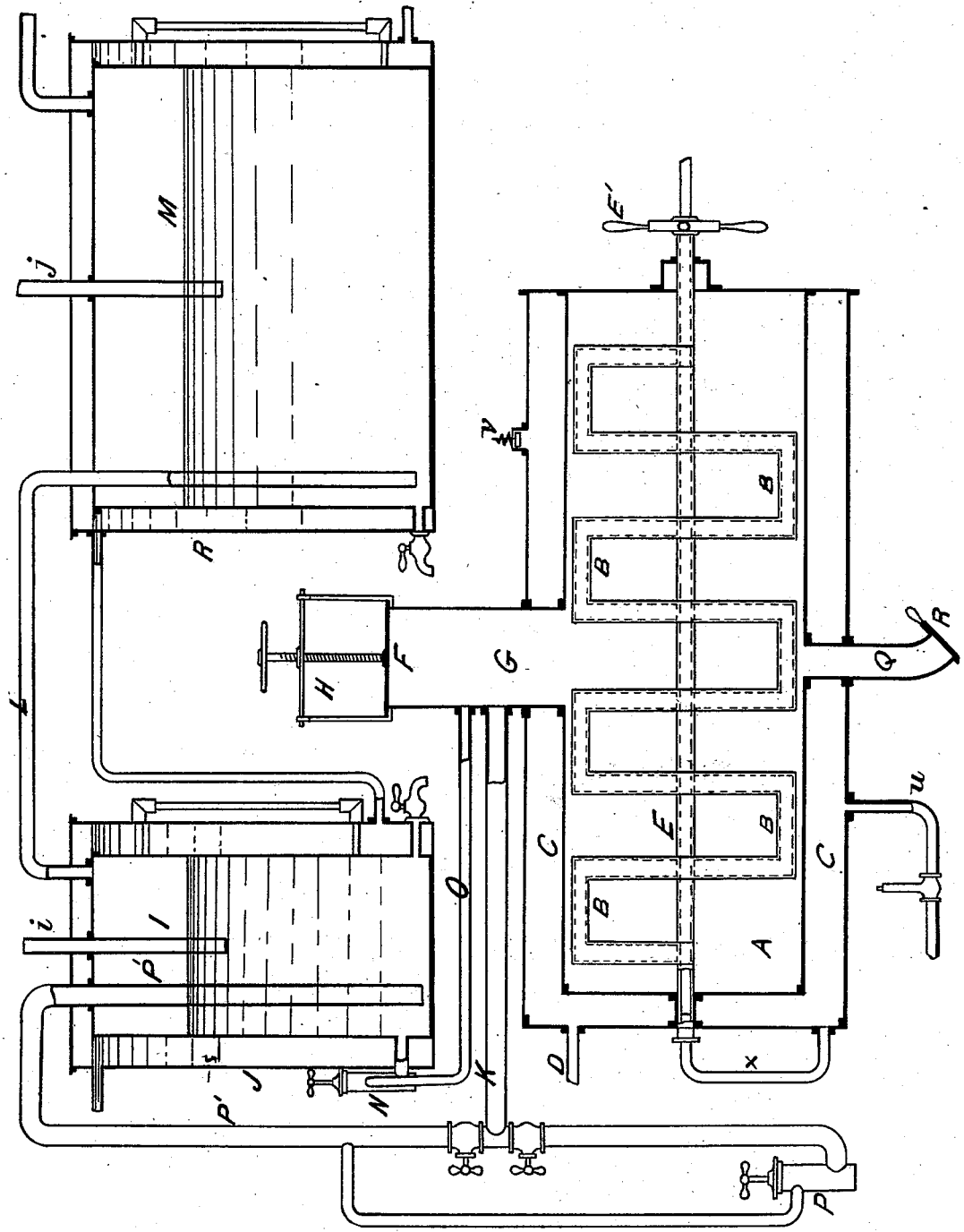

UNITED STATES PATENT OFFICE.

JAMES L. MARSH, OF BROOKLYN, ASSIGNOR TO THE CITY CHEMICAL COMPANY, OF NEW YORK, N. Y.

MANUFACTURE OF AQUA-AMMONIA.

SPECIFICATION forming part of Letters Patent No. 230,303, dated July 20, 1880.

Application filed March 20, 1879.

*To all whom it may concern:*

Be it known that I, JAMES L. MARSH, of the city of Brooklyn, county of Kings, and State of New York, have invented a new and Improved Method and Apparatus for Manufacturing Aqua-Ammonia, of which the following is a description in such full, clear, concise, and exact terms as will enable any one skilled in the art or science to which it appertains or with which it is most nearly connected to make and use the same, reference being had to the accompanying drawing, making part of this specification, and the letters of reference marked thereon.

My invention consists of an improved method of manufacturing aqua-ammonia, and of an improved apparatus to be used in the manufacture of the same.

My improvement consists substantially of the following method of treating sulphate of ammonia for the production of an improved liquor ammonia.

First, I take the sulphate of ammonia, fresh-slaked lime, and water, in the proportion of about sixty pounds of the sulphate, forty pounds of lime, and fifty gallons of water, and put them together in a cylindrically-formed retort, having its axis horizontally arranged and inclosed or surrounded by a chamber heated with steam or hot air, or gas of the desired temperature and pressure, and fitted with a horizontally-rotating stirrer having wings or beaters, by which the material under treatment can be thoroughly broken up, thrown over, and mixed around the horizontal axis of the retort or containing-vessel.

Second, I admit steam to the chamber inclosing the retort, and also to the shaft, arms, and wings of the stirrer in it, and raise the temperature of its contents to about 212° Fahrenheit and put the stirrer in motion, by which the lime and sulphate are thoroughly mixed, the water rapidly evaporated, and the ammoniacal gas freely liberated and carried over.

Third, I draw the ammoniacal gas from the retort and deliver it into the bottom of a condenser charged with water and inclosed in a chamber, C, filled with water continually entering at the bottom and discharging at the top, by which a hollow column of cold circulating water is made to inclose the condenser and cool its contents.

Fourth, from the condenser above described the unabsorbed gas passes to the bottom of a second condenser, also charged with water and inclosed or surrounded by a hollow column of circulating water, sustained by a jacket, to cool the contents of the containing-vessel, the same as in the case of the first condenser. The water in the first condenser or reservoir will absorb the ammoniacal gas until it becomes saturated. The gas will then rise through the water partially washed and purified and pass into the second condenser, and will be there absorbed until the water becomes saturated, when it will pass from that condenser to a third still further purified, and so on until the desired purity is obtained.

Fifth, after the water in the first condenser has become charged with the sulphate of ammonia I draw or pump it out of the condenser back into the retort and subject it again to the lime treatment in the retort.

Sixth, I draw the air and gas out of the retort by means of an air-pump or other exhausting and condensing apparatus, by which I am enabled to treat the material under a partial vacuum and a very low temperature.

My improved apparatus consists substantially of the following parts in combination, reference being had to the drawing.

A is the retort or containing-vessel above referred to, in which the sulphate and lime are treated; C, the jacket or chamber inclosing or surrounding the retort, and into which the steam is admitted to heat its contents; E, the shaft, and B the arms, wings, or beaters composing the horizontal rotating stirrer, the alternate ends of which are united, by which the material under treatment is more effectually thrown over, broken, and mixed. The shaft, arms, and connections of the stirrer are also made hollow, and the steam is introduced into one end of the shaft by means of a pipe fitted with a stuffing-box of the ordinary construction, and the water of condensation escapes out of the shaft and arms of the stirrer through a pipe, also fitted with a stuffing-box, and discharges in the heating-chamber C, as shown by *x*.

E is the wheel or pulley by which the stirrer is operated. G is a dome set on the retort, and fitted with a man-hole plate, F, and a screw-mounting, H, through which the retort is charged; and Q is a pipe fitted to the bottom of the retort and supplied with a gate, R, through which the refuse is discharged.

I is the first condenser above referred to, and J the jacket or chamber inclosing or surrounding it.

M is the second condenser above referred to, inclosed in the jacket or chamber R.

From the dome G leads a pipe, K, through which the gas escapes to the condenser, the pipe K connecting to the pipe P' leading into the condenser. The condensers are fitted with pipes $i\, j$, by which they can relieve themselves in case the pressure becomes too great.

N is a pump, by which the impregnated water can be drawn or pumped from the condenser back into the retort for a retreatment through the pipe O.

U is a pipe fitted with a suitable cock to draw the water of condensation out of the chamber C, inclosing the retort; and V is a valve held by a spring, to admit air to the jacket when the steam condenses, to prevent a vacuum in it.

P is an air-pump, by which the vapor and air can be drawn out of the retort and forced into the condenser. The apparatus is also fitted with the usual cocks and gages employed in such cases to regulate its operation.

The arms or wings of the stirrer should be made hollow, flat, and broad, to present a large heating-surface, and should be made equal in diameter to the retort or containing-vessel, or nearly so, to insure a perfect agitation of all the material under treatment.

Having now described my improved process and apparatus to be used in the manufacture of aqua-ammonia, I claim as new and desire to secure by Letters Patent—

The improved process herein described of manufacturing aqua-ammonia, consisting of heating a mixture of sulphate of ammonia, lime, and water by steam applied to the surface of the retaining-vessel, and at the same time agitating it around the axis of a horizontal stirrer to expose the greatest possible area of surface to the heat, and thus volatilize the same.

JAS. L. MARSH.

Witnesses:
AMOS BROADNAX,
WILLIAM H. BROADNAX.